(12) United States Patent
Holbrook

(10) Patent No.: US 10,640,407 B1
(45) Date of Patent: May 5, 2020

(54) SEPTIC TANK HAVING A LID WITH ACCESS PORT

(71) Applicant: Infiltrator Water Technologies, LLC, Old Saybrook, CT (US)

(72) Inventor: Paul R Holbrook, Old Saybrook, CT (US)

(73) Assignee: INFILTRATOR WATER TECHNOLOGIES, LLC, Old Saybrook, CT (US)

( * ) Notice: Subject to any disclaimer, the term of this patent is extended or adjusted under 35 U.S.C. 154(b) by 159 days.

(21) Appl. No.: 15/171,799

(22) Filed: Jun. 2, 2016

Related U.S. Application Data

(60) Provisional application No. 62/169,913, filed on Jun. 2, 2015.

(51) Int. Cl.
*C02F 3/28* (2006.01)
*B65D 90/10* (2006.01)
*B01D 21/00* (2006.01)

(52) U.S. Cl.
CPC ........ *C02F 3/2866* (2013.01); *B01D 21/0003* (2013.01); *B01D 21/0042* (2013.01); *B65D 90/105* (2013.01); *C02F 2201/002* (2013.01)

(58) Field of Classification Search
CPC .... E03F 11/00; E03F 5/16; E03F 5/10; B01D 21/02; B01D 21/0012; B01D 21/0003; C02F 3/288
USPC .......... 210/532.2, 601; 220/4.12; 405/41, 53
See application file for complete search history.

(56) References Cited

U.S. PATENT DOCUMENTS

| | | | |
|---|---|---|---|
| 4,171,740 A | 10/1979 | Clement et al. | |
| 5,071,021 A | 12/1991 | McDougall | |
| 5,162,083 A * | 11/1992 | Forbes | C02F 3/1242 210/199 |
| 5,423,447 A * | 6/1995 | Youngs | E02D 29/12 215/47 |
| 6,305,410 B1 * | 10/2001 | Cook | E03F 5/22 137/363 |
| 8,740,005 B1 | 6/2014 | Holbrook | |
| 9,260,854 B1 | 2/2016 | Moore | |
| 2004/0261343 A1 | 12/2004 | Koteskey | |
| 2006/0228222 A1 * | 10/2006 | Pohler | E03F 5/22 417/40 |
| 2007/0251879 A1 * | 11/2007 | Batten | B01D 17/0214 210/532.1 |
| 2009/0255871 A1 * | 10/2009 | Davis | C02F 3/06 210/615 |
| 2010/0012557 A1 * | 1/2010 | Chaffee | B01D 21/0012 210/86 |

* cited by examiner

*Primary Examiner* — Claire A Norris
(74) *Attorney, Agent, or Firm* — C. Nessler

(57) ABSTRACT

A tank suited for use as a septic tank or for otherwise holding or treating water has a top hatchway large enough to enable an adult person to enter the tank. The hatchway is closed by a lid which has a port with a removable cover, where the port that is large enough to enable through-passage of a suction line for cleaning the tank, but small enough to prevent a child from entering the tank. Preferably the port area is less than 6 percent of the effective area of the lid and the centerline of the port lies at a location which is between 20 to 80 percent of the radius of the lid.

14 Claims, 5 Drawing Sheets

SEPTIC TANK HAVING A LID WITH ACCESS PORT

This application claims benefit of provisional patent application Ser. No. 62/169,913, filed Jun. 2, 2015, the disclosure of which is hereby incorporated by reference.

TECHNICAL FIELD

The present invention relates to plastic tanks for containing water, more particularly tanks are buried in soil for use in wastewater treatment.

BACKGROUND

Septic tanks are used for primary treatment of wastewater, usually in connection with on-site subsurface systems that service residential dwellings and smaller commercial properties. Larger modern plastic septic tanks typically have two, top openings that are big enough for a person to enter into the tank. Typically such openings are at least 16 inch in diameter, more often 20 to 24 to 30 inch in diameter. Septic tanks are commonly buried in soil and a lid is secured to the opening(s) at the top of the tank, either directly or with an interposing riser.

A septic tank is desirably maintained every several years, particularly by suctioning through a hose the accumulated sludge proximate the tank bottom. To do that, the lids are removed and a flexible suction pipe line of 3-4 inch diameter is inserted into the tank opening, so it extends to the bottom of the tank. While that may suggest that only a small access opening might be sufficient, in most commonly available septic tanks the above-mentioned "man-size" openings are provided. One reason to have the large openings is that they enable man-access during manufacturing, for instance to install a baffle that divides the tank into fore and aft sections. Another reason is to enable relatively rare but important maintenance where access is needed to the interior, for such as to replace a baffle or fittings at the inlet or outlet ends of the tank. Tanks used for other purposes than wastewater treatment can present analogous needs which require an opening large enough to enable a human to enter the interior.

Most curious passing-by people, especially children, will not have sufficient tools to enable removal of the screws which typically secure a lid to the top of a tank or riser, if and when the lid is exposed. (In some locales it is increasingly preferred that the lids be above the surface of the soil.) In the course of maintenance and lid removal, the screws may be lost when removed; or through inattention or carelessness workers may fail to replace the screws. An unsecured lid, being light in weight, can be a tempting target for removal by curious people. It has been appreciated that an unfastened or otherwise easily removable lid is a potential hazard for a child, who could fall through the opening and into the water of the tank, to possible grievous end.

One option to addressing the problem might be to use screws or other kinds of fasteners of the lid which cannot be "lost," that is, fasteners which are trapped in the openings of the rim of the lid by locking rings. However, any such fastening system has to be easily used in the sometimes-poor cleanliness and weather conditions which attend septic tank maintenance, and has to be itself reliable and durable. Another option is to make the lid heavy, as by using a concrete lid like those used on old concrete septic tanks, or by adding weight to a plastic lid, as taught by Lombardi II U.S. Pat. Pub. 2005/0178721. Another preventive measure has been to put a net or grid within the large opening of a septic tank port, the device having openings large enough to enable pump-out line passage, but small enough to inhibit pass-through of a child. See for instance Koteskey U.S. Pat. Pub 2004/261343 and Gavin U.S. Pat. Pub. 2016/0122126.

Approaches which increase complexity or cost run counter to the aim of keeping plastic septic tank costs low, in context that plastic tanks are often competing in the marketplace with concrete tanks. There is a need for another approach to making septic tank lids "child-resistant" has to be low cost, reliable, and durable.

SUMMARY

An object of the invention is to provide a septic tank or a like tank having a man-sized opening with features which lessen the chance of a child falling through the opening, while at the same time making convenient access to the tank interior by means of a suction hose or the like.

In accord with an embodiment of the invention, a lid for a septic tank is circular in shape and has a port that is alternatively centered or off-center on the lid. The lid is installed on the rim of a septic tank hatchway or an associated riser, and secured to it by a multiplicity of hard-to-remove screws or other fasteners. A cover, which may or may not have fastening screws, removably seals the port. The port is sufficiently small in lateral dimension to prevent a child from falling through, while being sufficiently large to enable passage of a suction hose—thereby avoiding the need to remove the lid from the tank. As an example, the lid may be about 2 feet in diameter and the port may be 4 to 6 inches in diameter. The port opening area is a desirably small percentage (for example 1.8 to 6.2 percent) of the area of the opening which the cover closes off at the top of the tank.

In accord with embodiments of the invention, the port is preferably offset from the centerline of the lid, having a centerline that is located in a region that is between 20 and 80 percent of the effective radius of the lid, where effective radius is the radius of the area of the opening in the riser or tank which is closed off by the lid. (Said area is referred to as the effective area. See below.) Preferably, a lid installed on a tank has a port that is offset to the extent that its edge is either as near as it can be to the inlet end of the tank or as far as it can be from the inlet end of the tank, according to the choice of the installer, thereby to improve the ability of a pumper to suction sludge from the far reaches of the bottom of the tank during maintenance.

In a method of the present invention, a septic tank is installed within soil, a lid as just described is fastened to the tank by a plurality of fasteners at its periphery, and the tank is put into use. After a period of time, a pumper (worker) removes the cover over the port while leaving the lid fastened to the tank, inserts a suction hose in the port of the lid, and pumps out wastewater and sludge. When the port is offset, the ability of the pumper to reach a distant point is enhanced, compared to having a lid in the center of the lid. When the cleaning task is completed, the pumper then replaces the cover and the septic tank system is set for continued treatment of wastewater. Because the opening used by the pumper for pumping of sludge is small, the safety of the lid and septic tank as a whole does not depend on the fidelity of the pumper in replacing screws or other fasteners.

The foregoing and other objects, features and advantages of the present invention will become more apparent from the following description of preferred embodiments and accompanying drawings.

DESCRIPTION

The invention is described in connection with its use with septic tanks and other tanks that present the need for the kind of access which is described in the Background. Plastic septic tanks may be made by various ways including blow molding, rotational molding or injection molding of a thermoplastic such as polyethylene or polypropylene. The invention is preferably made by injection molding of such thermoplastics but may be made of the other materials.

Figure 1:
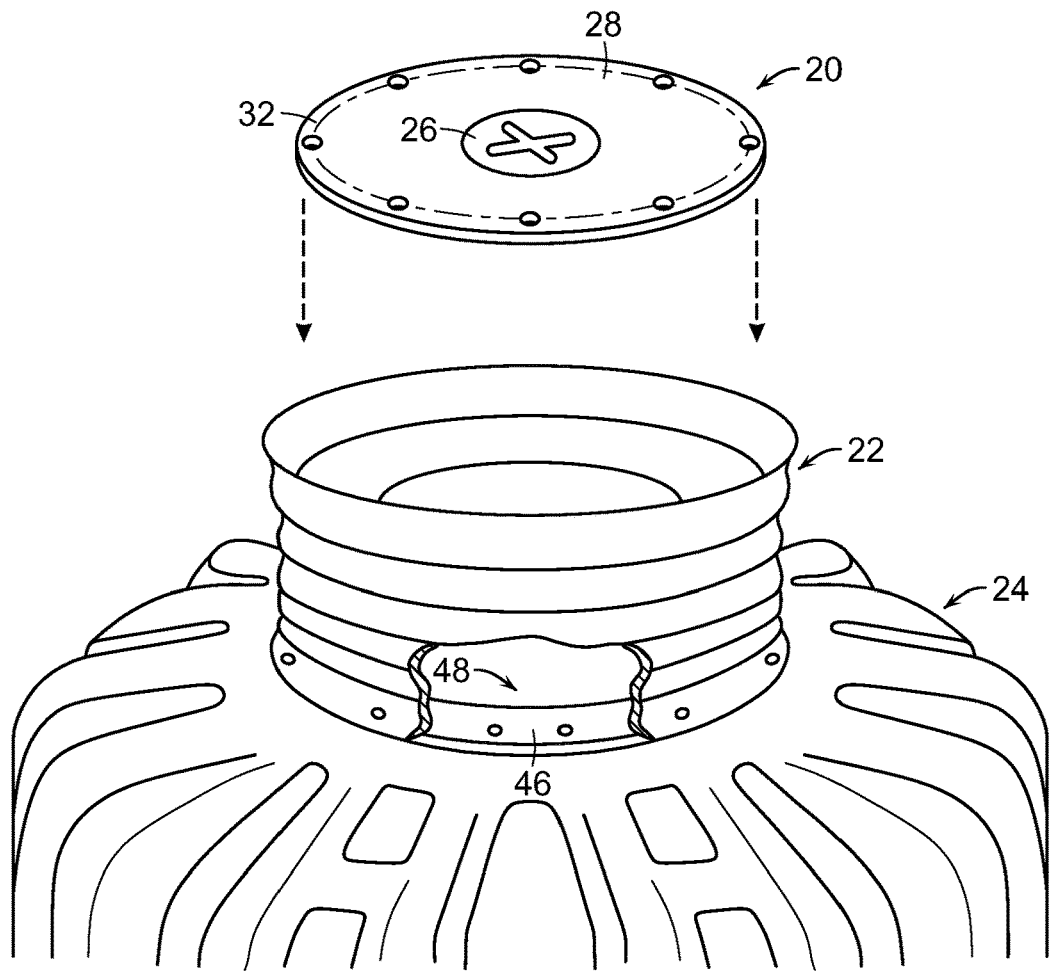
FIG. 1 is an exploded partial perspective view of the top of a round cross section septic tank showing how a lid mounts on a riser attached to the opening at the top of the tank.

FIG. 1 is a perspective view of the upper portion of a plastic tank 24 having a top opening 48 defined by tank rim 46, to which is attached a riser 22. An opening at the top of the tank which is large enough for a person to pass through is referred to herein as hatch opening. The terms hatchway, hatchway opening, and man-opening are used interchangeably. FIG. 1 shows in exploded fashion how lid 20 mounts on the top of the riser 22 which is mounted on the rim. Lid 20 has a cover 26 which is set within a centralized through-port. Optionally, the riser 22 is not present and the lid mounts directly on the rim 46 of the man-size opening 48 in the top of the tank. Typically, the dimension of the opening at the top of the riser will be about the same as the dimension of the opening at the top of the tank.

A lid of the present invention will be preferably circular or near-circular; or will be otherwise shaped so that the lid will not pass through the opening of the tank or riser on which the lid is used. Notwithstanding, the invention may be applied to lids which have other shapes.

Figure 2:
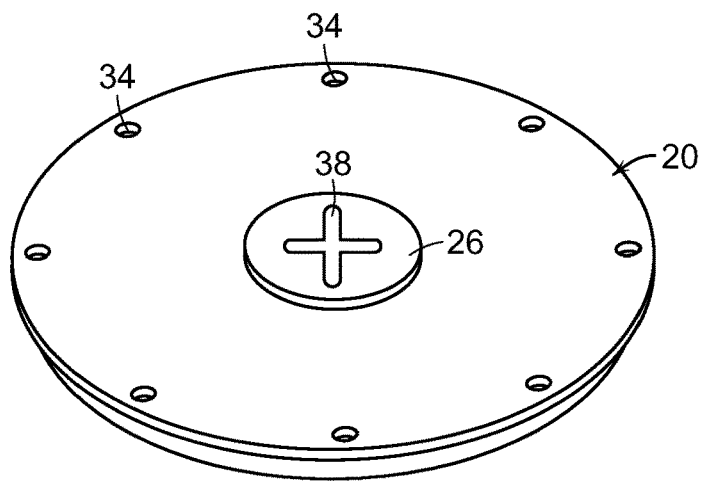
FIG. 2 is a perspective view of a lid having a access port (with cover) in the center.
Figure 3:
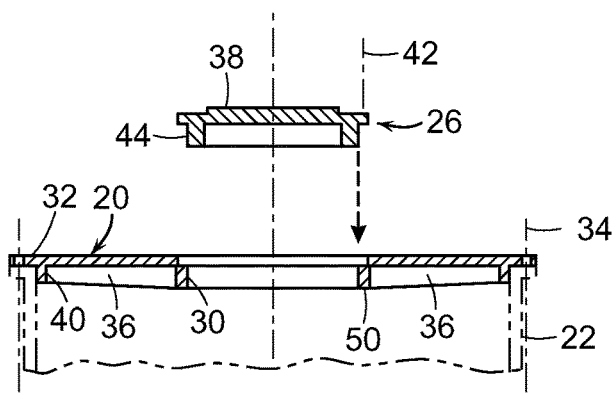
FIG. 3 is a cross section view of the lid shown in FIG. 2.
Figure 4:
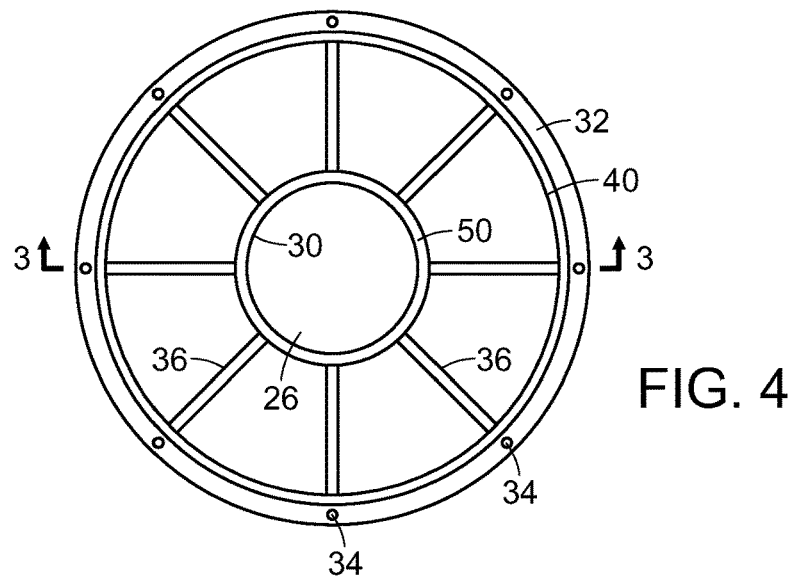
FIG. 4 is a bottom view of the lid shown in FIG. 2.

FIG. 2 shows lid 20 in perspective view. FIG. 3 is a transverse cross section of lid 20, with the cover 26 for the port in the lid spaced apart in exploded view fashion. FIG. 4 is a bottom view of lid. Lid 20 is circular in exterior shape and has a central through-port 30. The male stub portion 44 of cover 26 fits into the port, for instance, with a threaded fit or a slip fit.

A preferred embodiment lid 20 has a large diameter, sufficient to fit an opening that is typically of 16 inches to 24 inches to 30 inches in diameter. Lid 20 comprises a circumscribing rim 32 that is flange-like, for mating with the rim of a riser 22 or with the rim at the periphery of an opening at the top of a tank. With reference to FIG. 4, a preferred-configuration lid 20 has an underside with strengthening features such as circumferential rib 40 near the rim, a sleeve 50 which defines the bore of port 30, and a plurality of radial ribs 36 connecting the sleeve to the circumferential rib.

Preferably, lid 20 is secured by rim 32 to the top of the tank or riser by a plurality of un-easily removed fasteners, each of which passes through an opening 34 (portrayed by a central axis of the opening in some Figures). Fasteners which require a tool for removal, such as a hexagonal head bolts, slotted head screws, and Phillips head screws comprise un-easily removed fasteners, un from the standpoint of a casual passerby or playing-child.

An embodiment of cover 26 has a coarsely threaded male stub portion 44 which engages the threaded bore of the sleeve 50 of port 30. Cover 26 may have embossed (depressed or raised) features 38, to facilitate rotational engagement, manually or by tool. Optionally, a screw may be inserted through the edge of the top of the peripheral flange cover, along axis 42, as shown in FIG. 3, to stop casual removal of the cover by a passerby.

Figure 8:
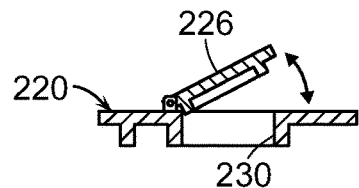
FIG. 8 is a perspective view of an alternate embodiment lid which has a hinged cover for the port.

Another embodiment of cover may or may not have a stub, and is fastened by a multiplicity of screws spaced apart around the periphery of the cover. In still another embodiment, not shown, the cover snap-fits into the opening of port 30; or the cover may have radially extending lugs that, upon twisting of the cover, engage mating features within the bore of port or at the underside of lid. In another embodiment, as shown in FIG. 8, lid 220 may have a cover 226 which is connected near the edge of port 230 by hinge 71. There may be a clasp or fastener for the cover, not shown, to keep it closed. The foregoing descriptions of alternative embodiments of ports and covers are applicable to other lids described below.

The opening size of port 30 is sufficiently small so that the risk of a child falling through the opening is low, for example, the port preferably may have an opening of 4 inch diameter or somewhat larger, up to 6 inch diameter, less preferably up to about 8 inch diameter. The opening dimension of the port is sufficient for passage of the suction hose of a septic tank pumper truck, but insufficient for access by a small child.

Commonly, a suction line, or suction hose, used by a pumper (which line is typically connected to a partially evacuated tank mounted on a truck) is nominally 3 inch to 4 inch diameter. When a port has a diameter larger than the nominal diameter of the suction line, for example a diameter approaching 6 inch, a pumper person may have to do less wrestling of the hose to pass it through the opening, and may be better able to cant the typically stiff suction hose within the port opening, in order to reach the interior boundaries of a septic tank.

For a port in the range of 4 to 6 inch diameter, the associated port opening area is between about 13 and about 28 square inches. In a preferred lid having a 4 to 6 inch diameter port which fits a tank having a 16 to 24 to 30 inch diameter hatch opening, as shown in Table 1, the ratio of port area to effective lid area (i.e., the area of the hatch opening which is covered by the lid, excluding the area of the rim by which the lid is attached to a tank or riser) is between about 1.8 percent and about 14 percent. For the more common 24 to 30 inch diameter openings, the port area is between about 1.8 percent and about 6.3 percent of the lid area, which parameters may be rounded off to about 2 to about 6 percent.

TABLE 1

Relationship of port area to lid area for selected lids.

| Item | 4 inch port, 12.6 sq inch area | 6 inch port, 28.3 sq inch area |
| --- | --- | --- |
| Percentage of 202 sq inch area of 16 inch diameter hatch | 6.2 | 14.1 |
| Percentage of 455 sq inch area of 24 inch diameter hatch | 2.8 | 6.3 |
| Percentage of 711 sq inch area of 30 inch diameter hatch | 1.8 | 4.0 |

The low percentage of areas is reflective of the small diameters of the ports in the lids of the present invention. At the same time a circular port is most efficient for a circular suction line, and best for minimizing localized stresses in a circular lid; and the area of a port is of course directly related to the square of the diameter.

An another embodiment of the invention, there is at least one port and it is located off center of the lid, as illustrated in lid 120, shown in FIG. 5 to FIG. 8. Two advantages of such kind of lids are as follows. First, a preferred lid has a flat or lightly crowned top surface. So, when soil or other uniform load is applied to the lid surface during use, or if a person steps on the center of the lid, the maximum stress will be in the center of the typical lid. Thus a port which is off-center is located in a lower stress region. Having the port area within the aforementioned low percentage area ranges enables a lid with a cover in place to be not greatly different in weight (and thus cost) than a lid having no port. Second, as illustrated by FIG. 9 and FIG. 9A an off-center port facilitates extending the suction line with the tank when the septic tank man-opening is not symmetrically located with respect to the tank interior, in contrast to the simplified septic tank suggested by FIG. 1, where the port is centered on a round tank.

Figure 5:
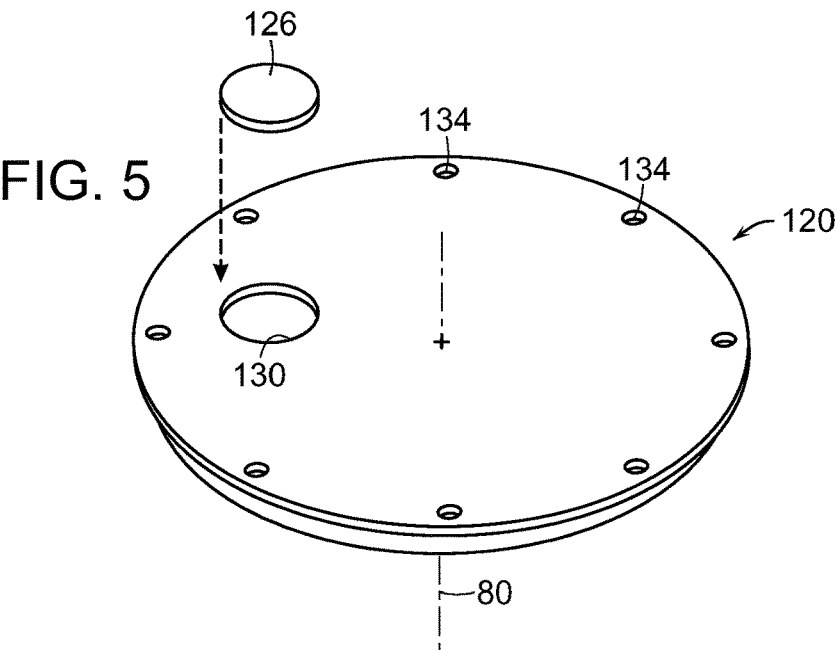
FIG. 5 is a perspective view of a lid having a port which is offset from the center of the lid.
Figure 6:
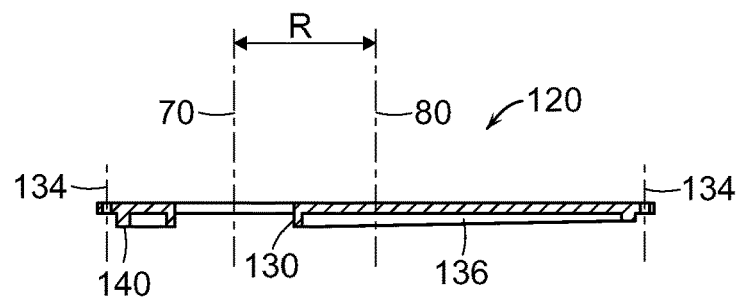
FIG. 6 is a cross section view of the lid shown in FIG. 5.
Figure 7:
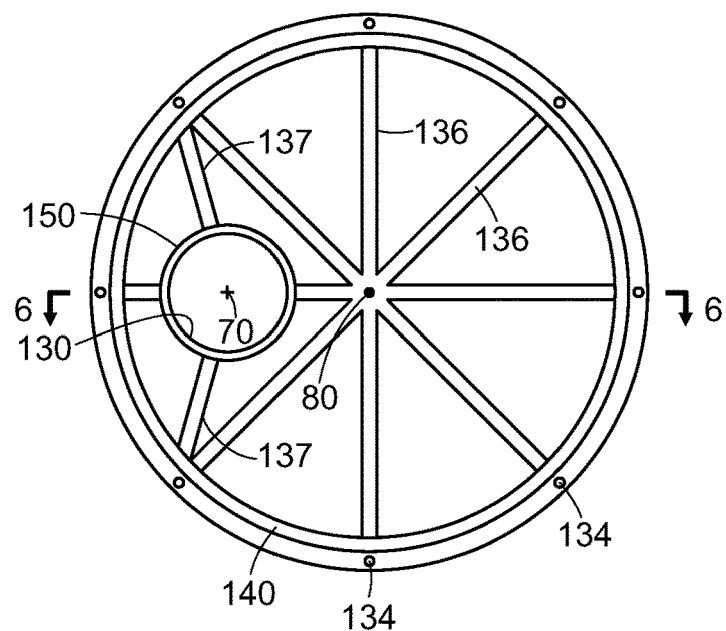
FIG. 7 is a bottom view of the lid shown in FIG. 5.

FIG. 5 is a perspective view of a lid 120, FIG. 6 is a cross section view and FIG. 7 is a view of the underside of the lid, all views analogous to those of the lid shown in FIG. 2. The center longitudinal axis 70 of the bore of port 130 is off center, being displaced a distance R from the location of the central longitudinal axis 80 of the lid. Intermediate ribs 137 run to the sleeve 150 which defines the opening of port 130, and except in the quadrant where the port is located, the ribs 136 run continuously on diameters of the lid, enhancing the strengthening effect of the ribs. An advantage of having the port offset is that it is in a lower stress region and thus the entirety of sleeve and ribbing may enable the lid to be somewhat lighter and therefore lower in cost than a lid with a central port.

Figure 9:
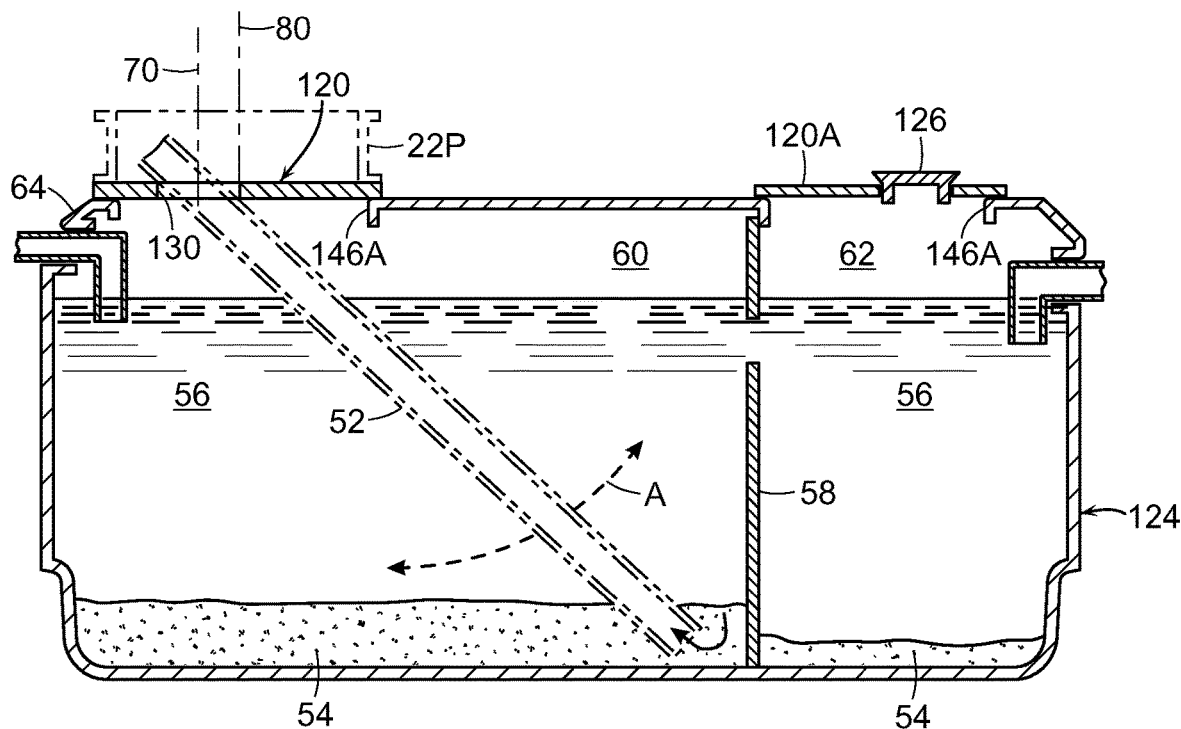
FIG. 9 is a vertical lengthwise cross section of a two-hatch septic tank showing a suction hose inserted through the port of one of the two lids, where then edge of the port is nearest to the inlet end of the tank.
Figure 9A:
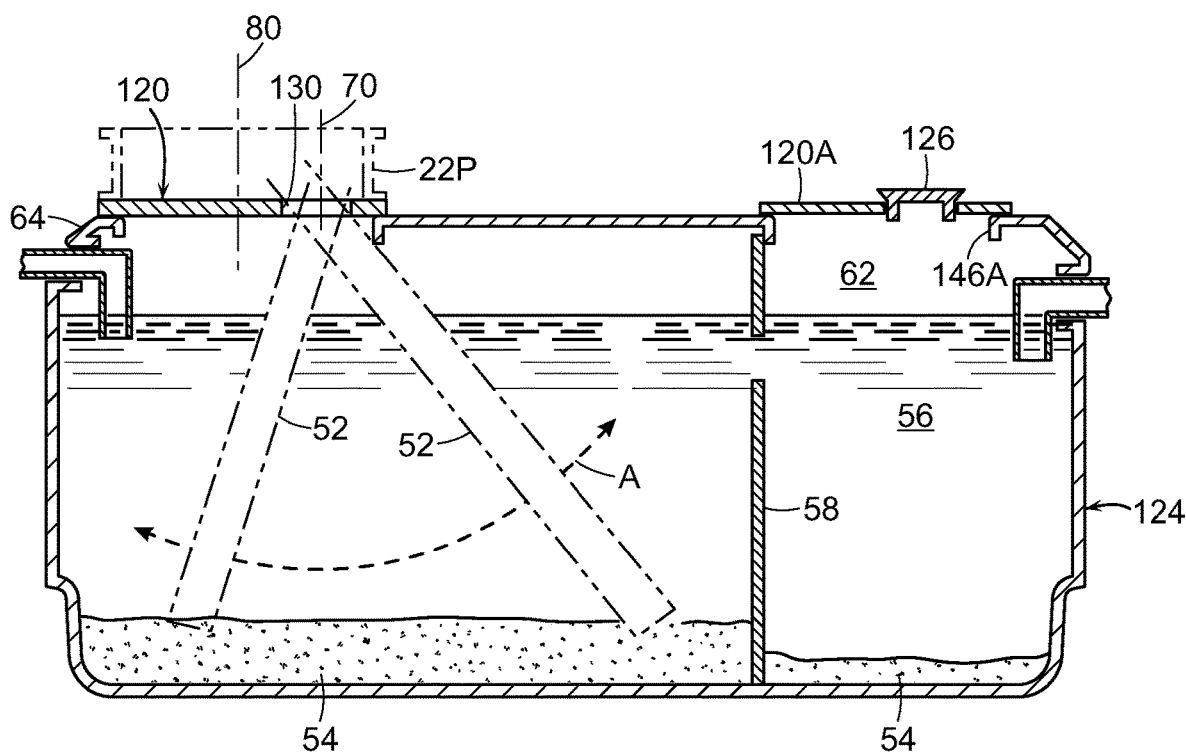
FIG. 9A is a vertical lengthwise cross section of a two-hatch septic tank showing a suction hose inserted through the port of one of the two lids, where the edge of the port is furthest from the inlet end of the tank.

FIG. 9 and FIG. 9A illustrate a functional advantage provided by a lid having an offset-from-center port. Both Figures show a "to-scale" lengthwise vertical plane cross section of a typical two-hatch molded septic tank 124, consistent with the construction of an IM-1060 septic tank (Infiltrator Water Technologies LLC, Old Saybrook, Conn.). Reference may be made to Holbrook et al. U.S. Pat. No. 8,740,005, the disclosure of which is hereby incorporated by reference. Such typical tank is about 5.5 feet high and 10.5 feet long. In use, tank 124 is typically buried in soil, not shown. The tank has an inlet end first compartment 60 that is separated from an exit end second compartment 62 by baffle 58. In use, wastewater flows via a conduit from a source into compartment 60, then through an opening in vertical baffle 58 and into compartment 62, then to an outlet conduit which typically directs the primarily-treated wastewater to a leach field.

The IM-1060 style tank which accords with the illustration has two 24 inch diameter hatchways (manholes) 146, 146A that during use are closed by lids 120, 120A. (A riser 22P, illustrated in phantom, may be present, and when that is so the lid typically will be on the top of the riser; although within the scope of invention a lid may be either within the bore of, or at the bottom of, the riser.)

FIG. 9 and FIG. 9A show a tank 124 after a long period of use. Tank 124 holds wastewater 56 and there is accumulated sludge 54 at the bottom. As can be seen, the first compartment is about $\frac{2}{3}^{rd}$ of the length of the tank; and the interior cavity of the first compartment is asymmetrically situated relative to its hatch opening and centerline. Thus the downstream end of the first compartment (i.e., the baffle) is further from the hatchway 146 than is the wall at the upstream end.

FIG. 9 shows a lid 120 like that shown in FIG. 5, with the port 130 offset maximally in the direction of the inlet end 64 of the tank—that is, the edge of the port is very close to the outer rim 140 of the lid (closer than shown in FIG. 5 to FIG. 7). From FIG. 9 it will be appreciated that since the centerline 70 of port 130 is offset in the upstream direction from the centerline 80 of the lid (and of the hatchway 146), the suction pipe 52, shown in phantom, can moved through an arc indicated by arrows A and can be canted in the downstream direction of the tank with less propensity for hitting hatchway rim 146, to enable the sludge near the baffle better to be suctioned into the pipe.

FIG. 9A shows a lid 120 that is attached to the tank with the port 130 offset so it is furthest from the inlet end of the tank—that is, the edge of the port is very close to the outer rim 140 of the lid. In this location the pumper can use a somewhat shorter length of suction pipe 52 to reach the sludge at the bottom of the tank near the baffle than when the port is in the center of the lid.

The installer of a lid 120 on the tank can make a choice about which location provides better advantage to the pumper, close or far from the inlet end—that of FIG. 9 or that of FIG. 9A.

Figure 12:
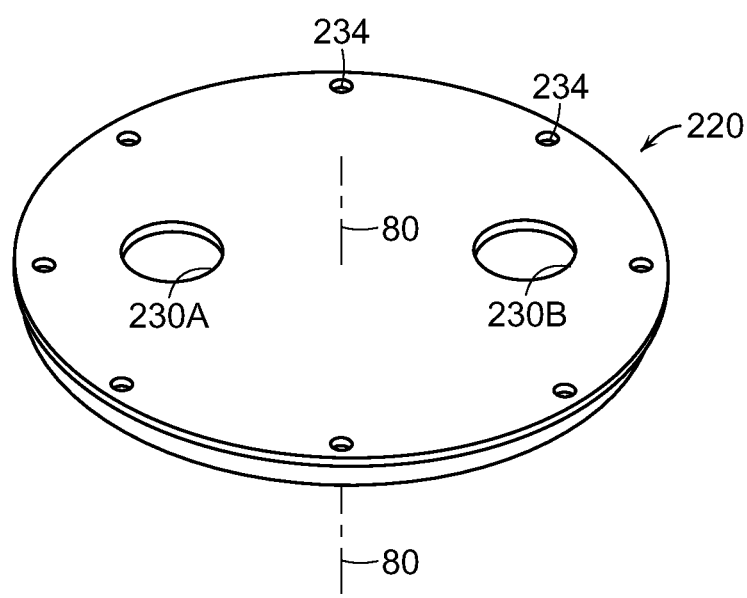
FIG. 12 is a perspective view of a lid having two offset ports.

FIG. 12 shows an alternative lid 220 which provides both the "near port location" and "far port location" options, but without providing the reduction in ribbing and plastic weight that is obtained by a single offset-port lid. Lid 220 has fastener holes 234 for attachment to a hatchway rim or riser. Lid 220 has two ports 230A, 230B, each spaced from the longitudinal centerline 80 of the lid in accord with the configuration of a lid having one port.

In some kinds of septic tanks there is a vertical strut or brace that supports the top of the tank, located on the lengthwise centerline of the tank adjacent a port, for instance, near the inboard end of the rim 146 of the hatchway of tank 124. See Moore et al. U.S. Pat. No. 9,260,854, the disclosure of which is hereby incorporated by reference. When such a brace is present, then the port of the lid that is present as shown in FIG. 9A can be offset left or right from the lengthwise centerline of the tank, to enable a suction line that extends in the direction of the baffle to pass to the left or right of the brace. A lid that is so installed with a bit of left-right offset relative to the tank lengthwise centerline will nonetheless, within the meaning of the present invention, comprise a lid having a port that is located at substantially the furthest distance on the lid from the inlet end of the tank.

Figure 10:
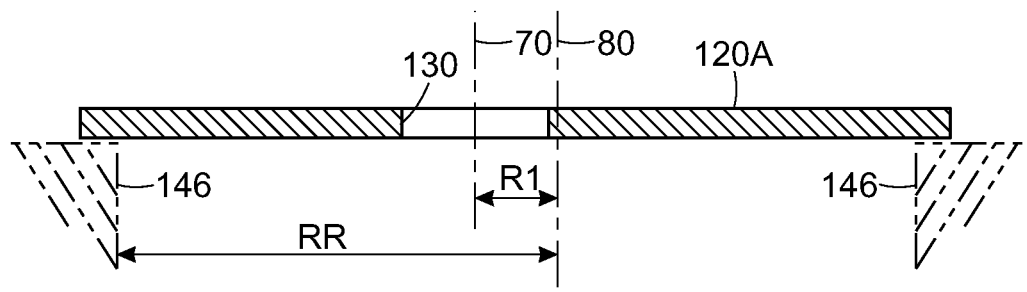
FIG. 10 is a cross section view like FIG. 6, showing a minimally offset port.
Figure 11:
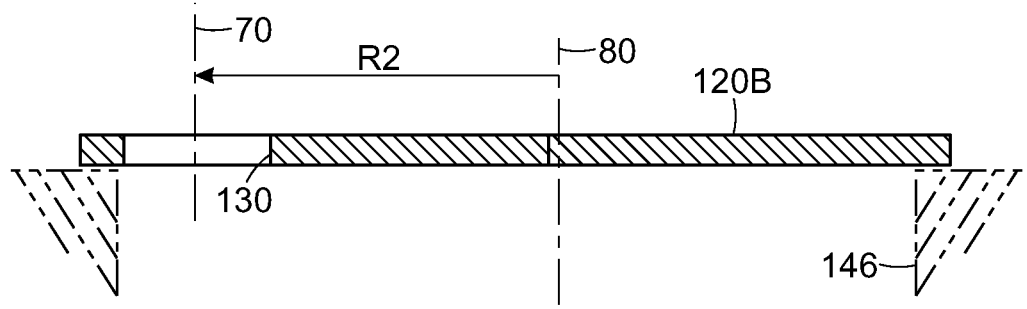
FIG. 11 is a cross section view like FIG. 6, showing a maximally offset port.

FIG. 10 and FIG. 11 show the range of port location displacement from the centerline 80 of the lid 120A, 120B, from a minimum R1 to a maximum R2, where the lid has an effective radius RR. The effective radius RR is the radius of the effective area of the lid as defined above. In the invention, at the minimum offset the inner edge of the port touches the center of the lid. At the maximum offset the outer edge of the port is very close to the bore of the hatchway which is covered by the lid, e.g., it is separated from the edge of the bore by the dimension of outer circumferential rim 140.

As an example, when the port 130 is 6 inch in diameter and the lid is 24 inch in diameter, R1 is 25% and R2 is 75% of the effective radius RR of the lid. For a 4 inch diameter port, R1 is 17% and R2 is 83%. Table 2 indicates the range of offset of ports for exemplary lids in terms of inches and the fraction percent of the effective radius RR. Preferably, the centerline of a port will be offset between 20 and 80 percent of the effective radius of the cover.

TABLE 2

Location of centerline of offset port relative to the centerline of the lid.

| Hatch Diameter inch | Port Diameter inch | Maximum offset R2 inch | Percent of Hatch Radius | Minimum offset R1 inch | Percent of Hatch Radius |
|---|---|---|---|---|---|
| 16 | 4 | 6 | 75 | 2 | 15 |
|  | 6 | 5 | 63 | 3 | 38 |
| 24 | 4 | 10 | 83 | 2 | 17 |
|  | 6 | 9 | 75 | 3 | 25 |
| 30 | 4 | 13 | 87 | 2 | 13 |
|  | 6 | 10 | 66 | 3 | 20 |

To pump out a tank having a lid of the present invention, the person doing the pumping (the pumper) will remove the cover from the port and insert the pumper hose in the port. When finished pumping, the pumper will replace the cover. Even if the pumper does not replace such fasteners as are used to secure the cover to the lid at the port location, or even if the cover can be later removed by such as a curious person of a child, a child will be inhibited from falling into the tank because of the smallness of the opening of the port.

From an ease of labor standpoint it will be more attractive, and beneficial from a safety standpoint, for the pumper to remove the cover of a port and not the whole of the lid. When soil covers the lid, a lesser amount of soil need be removed to expose the port, compared to removing the lid.

Thus for those artisans who have to maintain the septic tank, it is still possible to have man-access to the interior of the tank by removing (and then replacing) the fasteners at the peripheral rim of the lid. But when the ordinary every-few-year access is needed for pumping only of the contents of the tank, then only the cover of the port, and not the lid, need be removed.

The present invention may be used in connection with tanks suited for other than wastewater treatment, and may be used with tanks made of other than thermoplastic, including tanks made of thermoset resin reinforced with fiberglass and concrete. The present invention is applicable to tanks having openings which are large enough to allow a child to fall into the tank, even if the openings are smaller than the aforementioned "manhole size" openings of 16 inch diameter or more.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A septic tank having a lengthwise centerline, an elongate shape, an inlet end, an outlet end, a top, and opposing lateral sides running between said ends, which comprises:
    a baffle dividing the tank lengthwise into a first compartment having a first interior cavity and a second compartment having a second interior cavity, wherein the first interior cavity is bounded lengthwise by a wall at the inlet end of the tank and opposingly by the baffle, and wherein the first interior cavity is substantially larger than the second interior cavity;
    a tank top having a first hatch opening that is circular and has a diameter between 16 inches and 30 inches, said hatch opening having a diameter and a longitudinal centerline, said hatch opening providing man-size access to the first interior cavity;
    the tank top having a second hatch opening that is circular and spaced apart along the lengthwise centerline by a portion of tank top from the first hatch opening, the second hatch opening having an associated longitudinal centerline, the second hatch opening; providing man-size access to the second interior cavity; wherein, the tank top extends both laterally from said two hatch openings to the opposing lateral sides of the tank and lengthwise between the first hatch opening and the second hatch opening
    a lid, removably attached to the tank top to cover the first hatch opening, the lid having a longitudinal centerline, an effective radius and an associated effective diameter, a top surface, and a periphery;
    the lid comprising a port having a longitudinal centerline and a round bore that provides a passageway through the lid; said bore having a diameter between about 4 inches and about 8 inches in dimension;
    wherein the lid is attached to the tank top by a first plurality of fasteners that require a tool for removal thereof, and wherein said port is positioned nominally along the lengthwise centerline of the tank; and,
    a cover, removably mounted on the lid, closing off said bore of the port.

2. The tank of claim 1 wherein said first plurality of fasteners are selected from a group comprised of slotted head screws, hex head bolts, slotted screws, and Phillips head screws and combinations thereof.

3. The septic tank of claim 1 wherein the port opening bore has a cross sectional area which is between about 1.8 and about 6.2 percent of the effective area of said lid.

4. The septic tank of claim 1 wherein the longitudinal centerline of the port is offset from the longitudinal centerline of the lid by a distance which is between about 20 percent and about 80 percent of the dimension of the effective radius of the lid.

5. The septic tank of claim 1 wherein the port opening bore has an area which is between about 1.8 and about 6.2 percent of the effective area of said lid; and, wherein the longitudinal centerline of the port is offset from the longitudinal centerline of the lid by a distance which is between about 20 percent and about 80 percent of the dimension of the effective radius of the lid.

6. The septic tank of claim 1 wherein the port is positioned between the longitudinal centerline of the lid and the baffle.

7. The septic tank of claim 1 wherein the port is maximally positioned in the direction of the inlet end of the tank.

8. A septic tank having a lengthwise centerline, an elongate shape, an inlet end, an outlet end, a top, and opposing lateral sides running between said ends, which comprises:
- a baffle dividing the tank lengthwise into a first compartment having a first interior cavity and a second compartment having a second interior cavity, wherein the first interior cavity is bounded lengthwise by a wall at the inlet end of the tank and opposingly by the baffle;
- a tank top having a first hatch opening that is circular and has a diameter between 16 inches and 30 inches, said hatch opening having a diameter and a longitudinal centerline, said hatch opening providing man-size access to the first interior cavity; wherein said first hatch opening centerline is more distant from the baffle than from the inlet end wall;
- the tank top having a second hatch opening that is circular and spaced apart along the lengthwise centerline by a portion of tank top from the first hatch opening, the second hatch opening having an associated longitudinal centerline, the second hatch opening providing man-size access to the second interior cavity; wherein, the tank top extends both laterally from said two hatch openings to the opposing lateral sides of the tank and lengthwise between the first hatch opening and the second hatch opening;
- a riser attached to the tank at the first hatch opening, the riser having a longitudinal centerline, a top end, and a top opening having a diameter between 16 inches and 30 inches;
- a lid, removably attached to top opening of the riser to cover the top opening of the riser, the lid having a longitudinal centerline, an effective radius and an associated effective diameter, a top surface, and a periphery; the lid comprising a port having a longitudinal centerline and a round bore that provides a passageway through the lid; said bore having a diameter between 4 inches and 8 inches in dimension;
- wherein the lid is attached to top end of the riser by a first plurality of fasteners that require a tool for removal thereof, and wherein said port is positioned nominally along the lengthwise centerline of the tank; and,
- a cover, removably mounted on the lid, closing off said bore of the port.

9. The tank of claim 8 wherein said first plurality of fasteners are selected from a group comprised of slotted head screws, hex head bolts, slotted screws, and Phillips head screws and combinations thereof.

10. The septic tank of claim 8 wherein the port opening bore has a cross sectional area which is between about 1.8 and about 6.2 percent of the effective area of said lid.

11. The septic tank of claim 8 wherein the longitudinal centerline of the port is offset from the longitudinal centerline of the lid by a distance which is between about 20 percent and about 80 percent of the dimension of the effective radius of the lid.

12. The septic tank of claim 8 wherein the port opening bore has an area which is between about 1.8 and about 6.2 percent of the effective area of said lid; and, wherein the longitudinal centerline of the port is offset from the longitudinal centerline of the lid by a distance which is between about 20 percent and about 80 percent of the dimension of the effective radius of the lid.

13. The septic tank of claim 8 wherein the port is positioned so it is between the longitudinal centerline of the lid and the baffle.

14. The septic tank of claim 8 wherein the port is maximally positioned in the direction of the inlet end of the tank.

* * * * *